United States Patent [19]

Nimeck et al.

[11] 3,898,327

[45] Aug. 5, 1975

[54] ANTIBIOTIC AZDIMYCIN

[75] Inventors: Maxwell William Nimeck, North Brunswick; Edward Meyers, East Brunswick; Wen-Chih Liu, Princeton Junction, all of N.J.

[73] Assignee: E. R. Squibb & Sons, Inc., Princeton, N.J.

[22] Filed: Apr. 22, 1974

[21] Appl. No.: 462,822

[52] U.S. Cl.............................. 424/120; 195/80 R
[51] Int. Cl............................................. H61k 21/00
[58] Field of Search..................... 424/120; 195/80

[56] References Cited
OTHER PUBLICATIONS
Miller, The Pfizer Handbook of Microbial Metabolites, McGraw–Hill Book Co., Inc., N.Y., N.Y., 1961, page 608.

*Primary Examiner*—Jerome D. Goldberg
*Attorney, Agent, or Firm*—Lawrence S. Levinson; Merle J. Smith

[57] ABSTRACT

A new antibiotic, designated azdimycin, is produced by the microorganism *Streptomyces diastatochromogenes*. The antibiotic is useful as an antimicrobial agent.

4 Claims, 2 Drawing Figures

FIG. I

INFRARED SPECTRUM OF AZDIMYCIN

NMR SPECTRUM OF AZDIMYCIN

ANTIBIOTIC AZDIMYCIN

SUMMARY OF THE INVENTION

This invention relates to a new antibiotic azdimycin and to a method for its production. This antibiotic is obtained by cultivating the microorganism *Streptomyces diastatochromogenes* ATCC 31013 in an aqueous nutrient medium comprising an assimilable carbohydrate and an assimilable nitrogen source under submerged aerobic conditions until substantial antibiotic activity is imparted to the medium.

The antibiotic is recovered from the fermentation medium by filtering off the mycelium and additional antiobiotic is extracted from the mycelium with an alcohol, preferably methanol. The alcohol solution is concentrated, pooled with the broth filtrate and again extracted with an alcohol solution. Further purification is effected by concentration and chromatographing the concentrate.

DETAILED DESCRIPTION OF THE INVENTION

The Microorganism

Figure 1:
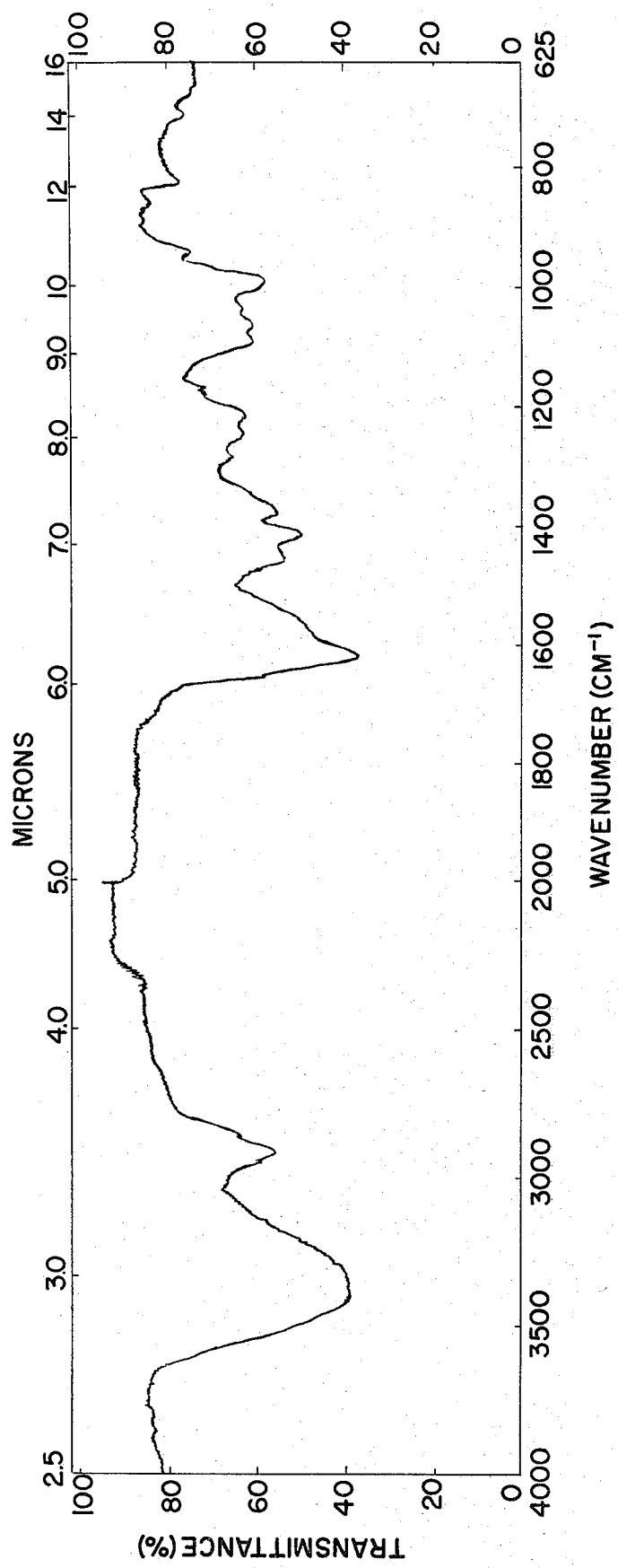
FIG. 1 shows the infrared spectrum of azdimycin (in KBr).

The microorganism useful for the preparation of azdimycin is a species of Streptomyces hereinafter designated *Streptomyces diastatochromogenes* ATCC 31013. A culture of the living organism has been deposited, and made a part of the stock culture collection of American Type Culture Collection (Rockville, Maryland), under the accession number ATCC 31013.

For isolating and characterizing the organism, a portion of the soil sample (obtained in New Canton, New Jersey) is shaken in sterile distilled water and plated on a nutrient agar containing:

| | |
|---|---|
| Yeast Extract | 4 gm. |
| Malt Extract | 10 gm. |
| Dextrose | 4 gm. |
| Agar | 20 gm. |
| Distilled water to 1,000 ml. | |

The medium is adjusted to pH 7.3 and sterilized in an autoclave at 121° C for 30 minutes. After 7 to 10 days incubation at 25°C, the colonies of *Streptomyces diastatochromogenes* ATCC 31013 are isolated from the plated soil. The isolated colonies are then grown on the medium described above.

The organism is a member of the gray spore color series of Phridham. It produces a spore mass that is light grayish-brown (ISCC No. 60) in color, matching color chip 3 ge in the Color Harmony Manual. Sporulation is abundant on the standard International Streptomyces Project medium ISP-3 (oatmeal agar). The colony reverse is colorless; no soluble pigment is produced. On yeast extract-malt extract agar (ISP-2), sporulation is abundant. The spores are gray. The colony reverse is colorless to yellow brown, and no soluble pigment is produced. On inorganic saltsstarch agar (ISP-4), sporulation is again abundant, and gray in color. The colony reverse is colorless and no soluble pigment is produced.

Microbiologically, the spore mass is produced on sporophores that are arranged in long, open spirals. The spore surface is smooth, as seen by electron microscopy.

Some culture characteristics of *Streptomyces diastotochromogenes* ATCC 31013 are as follows: melanoid pigment is produced on sodium caseinate-tyrosine agar. Good vegetative growth occurs between 14°–36°C, with the growth optimum being between 20°–25°C.

The carbohydrate utilization pattern of *Streptomyces diastatochromogenes* ATCC 31013 is set out below:

| | |
|---|---|
| Minimal medium (negative control) | − |
| Glucose (positive control) | + |
| Mannitol | + |
| Inositol | + |
| Sorbitol | − |
| d-Xylose | + |
| l-Arabinose | + |
| Rhamnose | + |
| Fructose | + |
| Raffinose | − |
| Galactose | + |
| Trehalose | + |
| Melibiose | (+)[1] |
| Sucrose | − |
| Lactose | + |

[1] Response in brackets indicates growth somewhat less than the positive control.

The Antibiotic

*Streptomyces diastatochromogenes* ATCC 31013 produces azdimycin, an antibiotic that possesses activity against bacteria. To form the antibiotic, *Streptomyces diastatochromogenes* ATCC 31013 is grown at about 25°C under submerged aerobic conditions in an aqueous nutrient medium containing an assimilable carbohydrate and nitrogen source. The fermentation is carried out for about 60 to 150 hours, preferably approximately 120 hours, at the end of which time the antibiotic has been formed.

After the fermentation has been completed, filter aid is added to the broth which is then filtered. The antibiotic is extracted from the mycelium (i.e., filter cake) with an alcohol, preferably a lower alcohol like methanol. The alcohol solution is concentrated in vacuo, leaving an aqueous suspension. The aqueous suspension is pooled with the broth filtrate which is then acidified to about pH 3 and the aqueous pool is then extracted with an aqueous lower alkanol solution, preferably water saturated n-butanol. The organic phase is concentrated to a syrup. Further purification is achieved by partition column chromatography on silicic acid-cellulose using n-butanol-ethyl acetate-water (1:6:1 v/v/v) as the developing solvent.

The biologically active fraction is then rechromatographed on a silicic acid column. Elution is effected with a sequence of eluants. These being, in the order of use, benzene:chloroform, 2:1, v/v; benzene: chloroform, 1:1, v/v; chloroform; chloroform, ethyl acetate, 1:1 v/v; ethyl acetate, and ethyl acetate, methanol, 9:1 v/v, and ethyl acetate, methanol, 3:1, v/v. The biologically active fractions obtained by this procedure are pooled and can be further purified by preparative scale chromatography on silica gel plates developed with 12% methanol in chloroform. A yellow band appearing under visible light is scraped off and eluted with methanol. The eluate is concentrated in vacuo and the preparative scale chromatographic procedure is repeated to effect final purification.

Based on physical and chemical properties, azdimycin appears to be similar to antibiotics X5108 and mocimycin, but can be differentiated from them. Thin layer chromatography on glass fibers impregnated with silicic acid (I.T.L.C., Type SAF, Gelman Instrument Company, Ann Arbor, Michigan) differentiates azdimycin and X5108 as shown:

| Solvent | $R_f$ | |
|---|---|---|
| | Azdimycin | X5108 |
| 1. Chloroform, methanol 9:1, v/v/v | 0.4 | 0.6 |
| 2. Chloroform, methanol, water 1:1:1, v/v/v, lower phase | 0.23 | 0.45 |

Azdimycin is differentiated from mocimycin by the oxygen content, the latter having 4 atoms of oxygen less than azdimycin. This difference is significant. Mocimycin has been shown to be the des-N-methyl derivative of X5108.

The invention is further illustrated by the following examples.

EXAMPLE 1

Tomato paste-oatmeal agar slants are seeded with *Streptomyces diastatochromogenes* ATCC31013. They are incubated 10–14 days and then used to inoculate 100 ml. of aqueous soybean meal medium contained in 500 ml. Erlenmeyer flasks. The composition of the germination medium is:

| | Grams |
|---|---|
| Toasted nutrisoy flour | 15 |
| Hi starch | 15 |
| Glucose | 50 |
| $CoCl_2.6H_2O$ | 0.005 |
| $CaCO_3$ | 10 |
| Distilled water to 1,000 ml. | |

The medium is sterilized for 30 minutes at 121°C. and at 15 lbs. pressure. The germination flasks are incubated at 25°C for 72 hours on a rotary shaker, operating at 280 r.p.m. with 2-inch throw.

A 5% (v/v) transfer is made from the germination flask to 500 ml. Erlenmeyer flasks containing 100 ml. of medium having the same composition as described above. The fermentation flasks are incubated and agitated as are the germination flasks. Samples are taken at 3, 5 and 7 days. They are examined after centrifuging off the mycelium. The supernate, acidified with hydrochloric acid to pH 3, is extracted with 0.5 volume of water saturated n-butanol. The mycelial pellet is extracted with a volume of methanol equal to that of the supernate. Both extracts are examined by thin layer chromatography and by bioassay. For chromatography, suitable amounts are spotted on sheets of glass fibers impregnated with silicic acid (I.T.L.C. Type SAF, Gelman Instrument Company, Ann Arbor, Mich.), and developed with a solvent consisting of chloroform, methanol, water (1:1:1 v/v/v) (lower layer). In this system, azdimycin has an $R_f$ value of approximately 0.23. The antibiotic is detected by bioautography against *Escherichia coli* ATCC 10536.

EXAMPLE 2

A 250 liter batch of *Streptomyces diastatochromogenes* ATCC 31013 is fermented in a 100 gal. stainless steel vessel with the media and operating conditions described below.

Stage 1

Inoculum: Culture of *Streptomyces diastatochromogenes* ATCC 31013 preserved by lyophilization in milk and grown out on tomato paste-oatmeal agar slants. Surface growth from a slant is suspended into 11 ml. of 0.01 percent Dupanol solution and is used as the source of inoculum.

| Medium | Grams |
|---|---|
| Toasted nutrisoy flour | 15 |
| Hi starch | 15 |
| Glucose | 50 |
| $CoCl_2.6H_2O$ | 0.005 |
| $CaCO_3$ | 10 |
| Distilled water to 1,000 ml. | |

1500 ml. of this medium in a 4-liter flask is incubated 96 hours on a rotary shaker. The shaker operates at 125 r.p.m. with a 2-inch throw.

Stage 2

Inoculum: 1,500 ml. from the first stage.
Medium: Same as stage 1, with the addition of 0.5 grams Ucon LB 625 as an antifoam agent.

Thirty (30) liters of the medium containing the inoculum is incubated for 96 hours. During incubation, the broth is aerated at the rate of 2.3 cubic feet per minute with agitation at 220 r.p.m.

Stage 3

Inoculum: 12,500 ml. from stage 2.
Medium: Same as stage 2

Two hundred fifth (250) liters of the medium containing the inoculum is incubated for 144 hours. During incubation, the broth is agitated at 155 r.p.m. and aerated at the rate of 10 cubic feet per minute.

EXAMPLE 3

Filter aid (Hyflo) (22.7 kg.) is added to 420 liters of pooled fermentation broth, obtained as described in Example 2, and the insoluble material is removed by filtration to yield approximately 125 kg. of insoluble cake. The insoluble cake is washed with water, and the washings pooled with the filtrate to yield 450 liters.

EXAMPLE 4

The filter cake (125 kg) obtained in Example 3, is extracted 3 times with 100 liter portions of methanol. The cake is filtered between extractions. The combined methanol extracts are concentrated to 3.5 liters in vacuo to remove the methanol. The resulting aqueous suspension is added to the 450 liters of filtrate obtained in Example 3.

EXAMPLE 5

The combined aqueous layers, adjusted to pH 3 with concentrated hydrochloric acid (1,000 ml.), are extracted three times with 150 liter portions of water saturated n-butanol. Combining of the butanolic extracts gives 219.5 liters. The butanol pool is reduced in volume to 4 liters by concentration in vacuo. Approximately 800 ml. of the butanol concentrate is further concentrated in vacuo to a thick syrup, weighing approximately 100 grams. This material is next subjected to partition column chromatography. Approximately 400 g. of silicic acid is thoroughly mixed with 200 g. of cellulose powder followed by 50 ml. of the lower layer from a solvent system consisting of n-butanol, ethyl acetate, water 1:6:1, v/v/v. To the wetted adsorbent mixture is added excess of the upper layer of the solvent system to form a slurry. The slurry is poured into a glass chromatographic column, to yield an adsorbent bed of 6 × 60 cm.

Approximately 100 grams of the syrup described above is dissolved in 20 ml. of the lower layer of the n-butanol, ethyl acetate, water, 1:6:1, v/v/v/ solvent system. To this solution is added 20 g. of the silicic acid, cellulose mixture used to prepare the partition column. The whole is slurried in excess of the upper layer of the solvent and is charged onto the top of the column. The column is developed with the upper layer of the n-butanol, ethyl acetate water solvent, 1:6:1, v/v/v, 50 ml. fractions being collected. The bioactive fractions, as determined by paper disc-agar diffusion assay against *Escherichia coli* ATCC 10536 are combined and concentrated to dryness yielding 20 grams of material.

EXAMPLE 6

The material, 20 grams, obtained in Example 5, is dissolved in 20 ml. of benzene, chloroform 2:1 v/v and placed on top of a silicic acid column, 4 × 60 cm, containing 200 grams of silicic acid packed in the benzene, chloroform, 2:1 v/v solvent and eluted first with the same solvent as used to pack the silicic acid (0.5 liters), then with benzene, chloroform 1:1 v/v (0.5 liters), chloroform (0.5 liters), chloroform, ethyl acetate, 1:1, v/v (0.5 liters), ethyl acetate (0.5 liters), ethyl acetate, methanol, 9:1 v/v (0.5 liters) and ethyl acetate, methanol 3:1 v/v (0.5 liters). The chromatographic fractions, 15 ml. each, are conveniently followed by paper-disc, agar diffusion assay against *Escherichia coli* ATCC 10536. The active fractions are pooled and concentrated to dryness to yield approximately 3 grams of residue.

EXAMPLE 7

Three (3) grams of residue, obtained in Example 6, dissolved in 10 ml. of methanol, is streaked approximately 2 cm. from the bottom of 20 cm. × 20 cm. 1,000μ layer silica gel plates. The plates are developed with 12% methanol in chloroform. Azdimycin appears as a dark band under an ultraviolet lamp (254 mμ lamp) and as a yellow band when viewed with visible light ($R_f$ approximately 0.25). The band is scraped off the plate and eluted from the silica gel with methanol. The methanol eluate is concentrated to dryness, and the residue, redissolved in a small volume of methanol is rechromatographed on silica gel plates as described above. The process may be repeated one or two more times to effect complete purification. By these means, 150 mg. of pure azdimycin is obtained.

Appearance: A yellowish, amorphous powder

Figure 2:
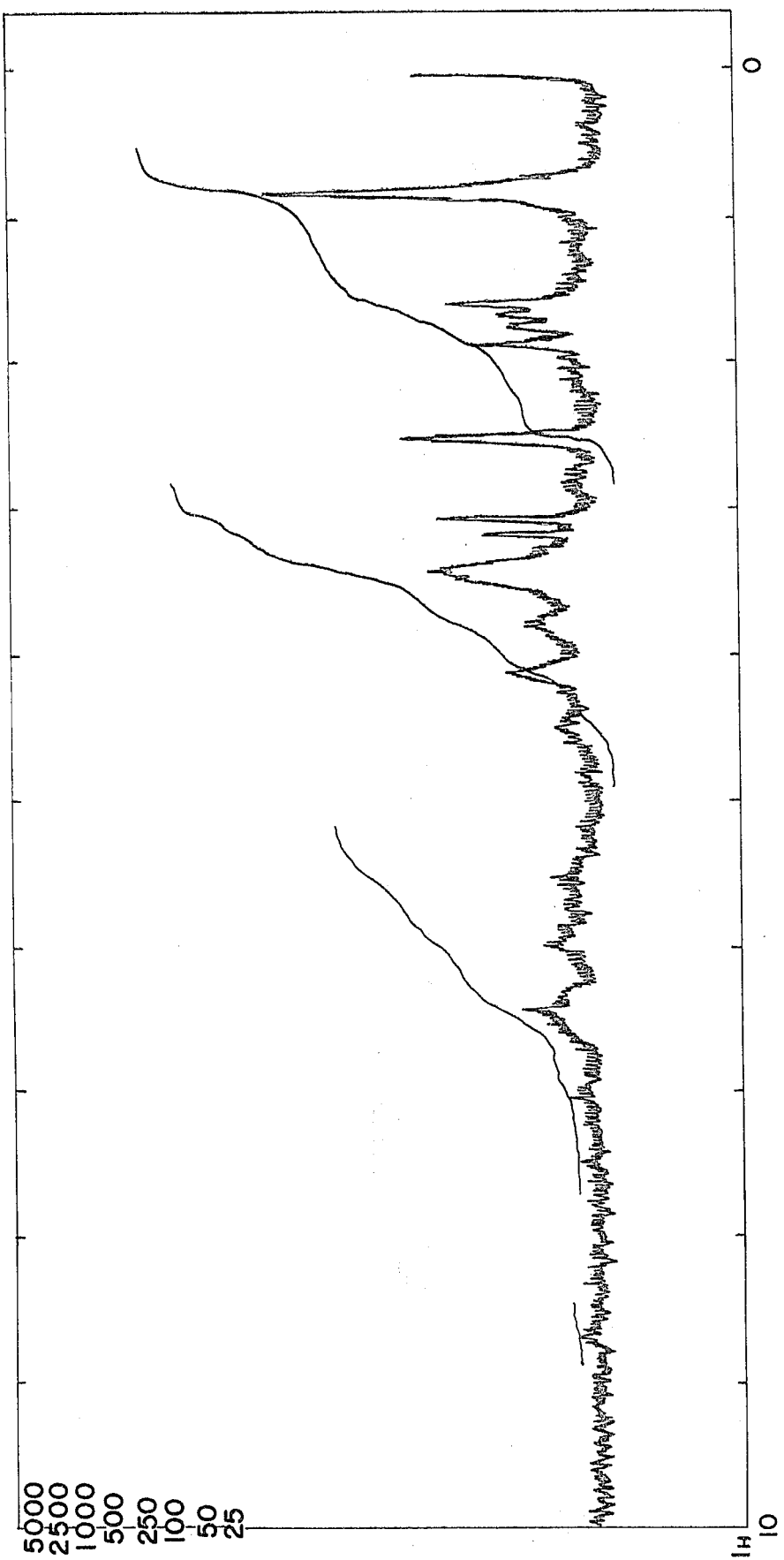
FIG. 2 shows the NMR spectrum of azdimycin (DMSO - $d_6$).

Anaylsis: (percent): C, 59.95, H, 7.25, N, 3.05
UV: max in methanol, 233 nm ($E_{1cm}^{1\%} = 900$), 323 nm ($E_{1cm}^{1\%} = 450$). max in dil. HCl, 233 nm ($E_{1cm}^{1\%} = 900$), 345 nm ($E_{1cm}^{1\%} = 450$)
m.p.: 180°–182°C.
M.W.: 850 by mass spectrometry
Solubility: Azdimycin is soluble in methanol, ethanol. Insoluble in water, benzene, ether.
Empirical formula: $C_{43}H_{60-62}N_2O_{16}$
IR: See FIG. 1.
MNR: See FIG. 2.
Color tests: Azdimycin gives a positive test with ninhydrin, a brown color when treated with methanolic $FeCl_3$, a dark brown color with anthrone and no color change occurs when azdimycin is treated with methanolic HCl.

Azdimycin is useful as an antimicrobial agent to combat infections caused by microorganisms such as Streptocci, e.g., *Streptococcus pyogenes*. The antibiotic can be used as an environmental disinfectant, e.g., in a spray or dust containing up to about 1 percent of the substance in a conventional carrier, or to combat infection in various animal species, due to microorganisms such as those referred to above, e.g., topically in a conventional cream, ointment or lotion containing up to about 1% of the substance or in an injectable dosage form for use in mice or fowl at about 50 to 200 mg/kg/day.

EXAMPLE 8

Two-fold tube dilution assays were done with several microorganisms. The antibiotic used in this study was the pure material obtained in Example 7.

| Organism | MIC ($\mu$g/ml) |
| --- | --- |
| *Staphylococcus aureus* 209P | $\geq 50$ |
| *Streptococcus pyogenes* C203 | 0.03 |
| *Escherichia coli* ATCC 10,536 | 6.3 |
| *Escherichia coli* SC 8294* | $\geq 50$ |
| *Pseudomonas aeruginosa* SC8329* | $\geq 50$ |
| *Candida albicans* SC5314* | $\geq 50$ |
| *Trichomonas vaginalis* SC 560* | 12.5 |

*Squibb Culture Collection

EXAMPLE 9

Mice were intraperitoneally injected with 1,000 $LD_{50}$ doses of *Streptococcus pyogenes* C203, and 1 hour and 5 hours post-infection were given antibiotic azdimycin subcutaneously. The material used in this study was the pure material obtained in Example 7. Approximately 100–200 mg/kg of the antibiotic were sufficient to protect 50 percent of the mice against death.

What is claimed is:
1. The antibiotic azdimycin having the infrared spectrum in FIG. 1, the approximate analysis: C, 59.95, H, 7.25; N, 3.05, melting point about 180°–182°C., molecular weight approximately 850, soluble in methanol and ethanol and insoluble in water, benzene and ether.
2. A process for producing antibiotic azdimycin as defined in claim 1 which comprises cultivating *Streptomyces diastatochromogenes* ATCC 31013 in an aqueous nutrient medium comprising an assimilable carbohydrate and an assimilable nitrogen source under submerged aerobic conditions until substantial antibiotic activity is imparted to the medium.
3. A process as in claim 1 wherein the microorganism is cultivated at about 25°C.
4. A process as in claim 3 wherein the fermentation is continued for about 60 to 150 hours.

* * * * *

UNITED STATES PATENT OFFICE
CERTIFICATE OF CORRECTION

PATENT NO. : 3898327

DATED : August 5, 1975

INVENTOR(S) : Maxwell William Nimeck et al.

It is certified that error appears in the above-identified patent and that said Letters Patent are hereby corrected as shown below:

Title page - add the following inventor - William E. Brown, Princeton, New Jersey.

Column 4, line 44 -- fifth -- should be fifty.

Signed and Sealed this seventeenth Day of February 1976

[SEAL]

Attest:

RUTH C. MASON
Attesting Officer

C. MARSHALL DANN
Commissioner of Patents and Trademarks